July 1, 1924.

G. A. RENSTROM

SOLDERING INSTRUMENT

Filed Feb. 17, 1923

1,499,945

Inventor
G. A. Renstrom

By J. P. Lorin

Attorney

Patented July 1, 1924.

1,499,945

UNITED STATES PATENT OFFICE.

GEORGE A. RENSTROM, OF BREMERTON, WASHINGTON, ASSIGNOR OF ONE-FOURTH TO DEA GUY LOWE, ONE-FOURTH TO ROBERT LINN TOTTEN, AND ONE-FOURTH TO EDWARD W. BONNEAU, ALL OF COUNTY OF KITSAP, WASHINGTON.

SOLDERING INSTRUMENT.

Application filed February 17, 1923. Serial No. 619,753.

*To all whom it may concern:*

Be it known that GEORGE A. RENSTROM, a citizen of the United States, residing at Bremerton, in the county of Kitsap and State of Washington, has invented certain new and useful Improvements in Soldering Instruments, of which the following is a specification.

This invention relates to improvements in soldering devices of that type designed particularly for the soldering or burning of lead, wherein it is necessary to preserve the heat at a constant and high temperature despite the cooling effect of the metal.

The invention is more particularly directed to an attachment for blow torches of more or less conventional type, in which the heat of the flame is particularly directed and controlled to maintain an extremely high and uniform temperature at the soldering point of the attachment, to thereby permit constant and effective use of the device notwithstanding the cooling effect of the metal with which it is used.

The invention further contemplates the provision of an attachment of this character which may readily be applied to or removed from the blow torch, and which may be adjusted relative to the flame outlet of the blow torch to control the heating effect of such flame.

The invention is illustrated in the accompanying drawings, in which.

Figure 1:
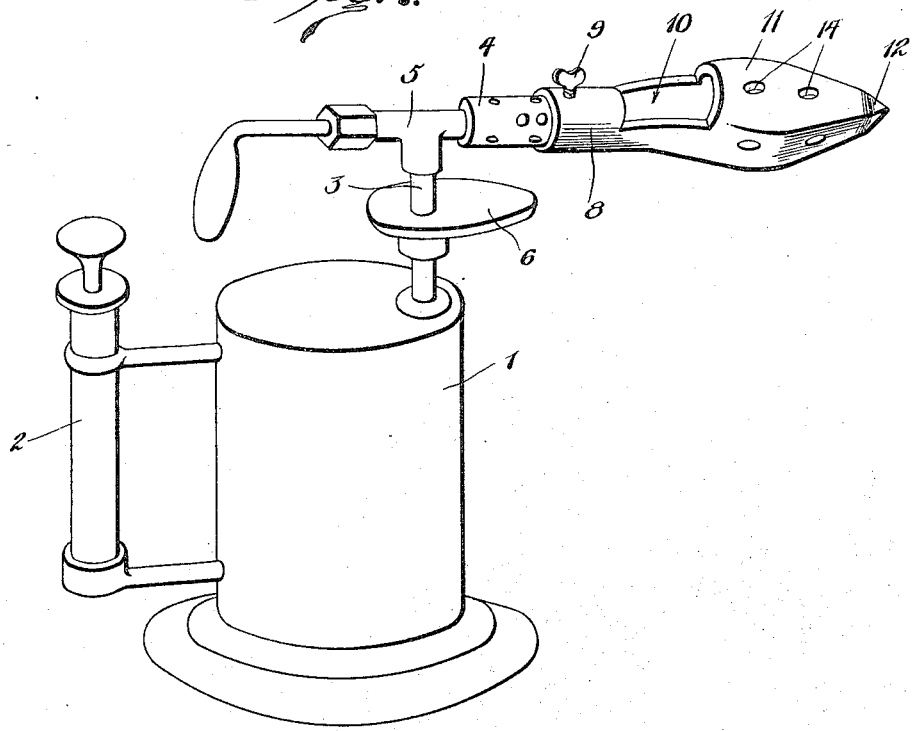
Fig. 1 is a perspective view of the blow torch provided with the improved soldering attachment.
Figure 2:
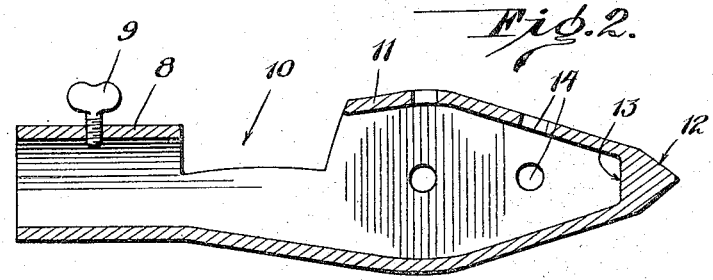
Fig. 2 is a longitudinal section of the attachment.

In connection with the invention proper, there is shown a conventional form of blow torch, including a reservoir 1, to which is connected the usual pump 2 for exerting the desired feeding pressure on the fuel in the reservoir. The reservoir has the upstanding outlet 3 connected with the horizontal vaporizing channel 4, the flow of the fuel being through the usual control 5. A starting or vaporizing basin 6 is arranged below the vaporizing channel 4 for the initial vaporizing of the fuel, as is usual in torches of this type.

The improved attachment, which may be termed a soldering point, comprises a cylindrical body 8 having an internal diameter at the rear end capable of slidably embracing the vaporizing pipe 4, a set screw 9 holding the body in adjusted position lengthwise the vaporizing pipe. Immediately forward of the rear end, the body of the soldering point is enlarged and formed in the upper portion with an opening 10, and in advance of this opening, the body is laterally and upwardly enlarged at 11 and then formed into a point 12 having the usual shape of soldering or burning points. The point proper 12 is solid throughout its length, that is, the inner wall 13 of the point constitutes the forward wall of the hollow body of the attachment. The wall of the body rearwardly of the point 12 and forwardly of the opening 10 is formed with a series of air inlet openings 14, to increase the heating effect immediately adjacent the point proper.

In use, the fuel of the torch is initially vaporized and ignited in the usual manner after the application of the attachment to the vaporizing pipe. The pressure of such fuel causes the flame to extend lengthwise the hollow body of the attachment and be directed against the inner wall of the point 12. The air to maintain combustion at the ignition end of the vaporizing pipe 4 is admitted through the opening 10, and as the flame impinges the inner wall of the point 12, the fine globules of unconsumed fuel, which are carried out from the vaporizing pipe 4, are broken up against the wall of the point, and the air admitted through the openings 14 adjacent said wall provides the necessary oxygen for mixing with these broken up fuel globules to insure an unusual degree of heat at this particular point.

The heat of the blow torch accentuated by the construction of the attachment rapidly heats the point 12 to a substantially white heat, maintaining it in this condition during use. The point 12 may thus be effectively utilized for all soldering and burning purposes, wherein a constant and high degree of heat is required, which will not be reduced by the metal in which the point is working. Obviously, by longitudinal adjustment of the attachment with respect to the vaporizing pipe 4, a degree of heat of the point 12 may be readily controlled. The attachment may be readily removed whereupon the blow torch is capable of all ordinary uses of such article.

Claim:

A soldering point for use with blow torches, comprising an integral hollow body including a sleeve terminal to slidably engage the vaporizing pipe of the blow torch, a set screw to secure the point to said pipe, the body in advance of the sleeve terminal being enlarged and formed with a soldering point, said body immediately in advance of the sleeve terminal being formed with an air admission opening, the wall of the body in advance of the opening and adjacent the soldering point being formed with a plurality of small openings.

In testimony whereof I affix my signature.

GEORGE A. RENSTROM.